July 1, 1924.　　　　　　　　　　　　　　　　1,499,812
F. W. ERICKSON
PIPE CUTTING OR SAWING MACHINE
Filed June 28, 1921　　　4 Sheets-Sheet 1

July 1, 1924.

F. W. ERICKSON 1,499,812

PIPE CUTTING OR SAWING MACHINE

Filed June 28, 1921    4 Sheets-Sheet 2

July 1, 1924.  
F. W. ERICKSON  
PIPE CUTTING OR SAWING MACHINE  
Filed June 28, 1921    4 Sheets-Sheet 3
1,499,812
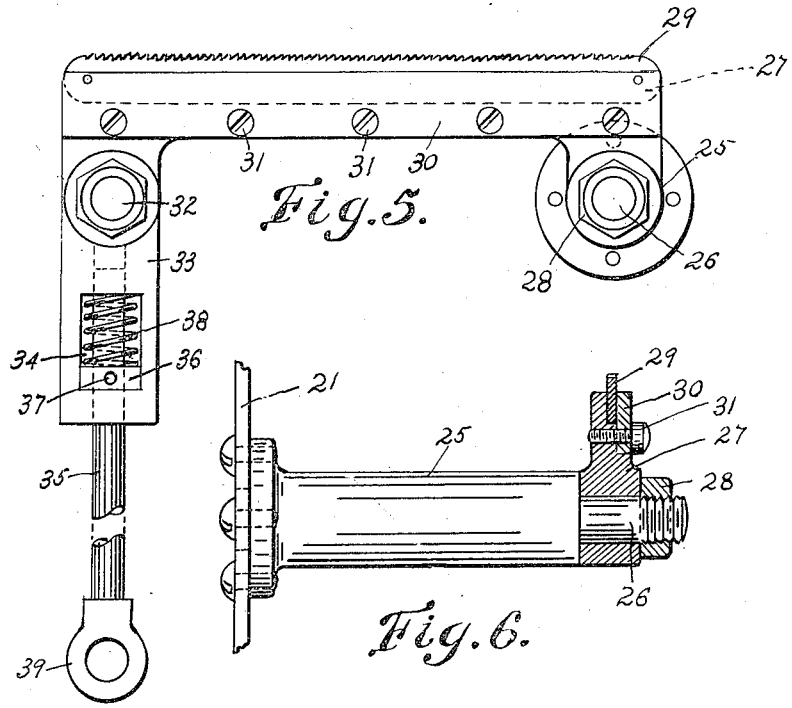
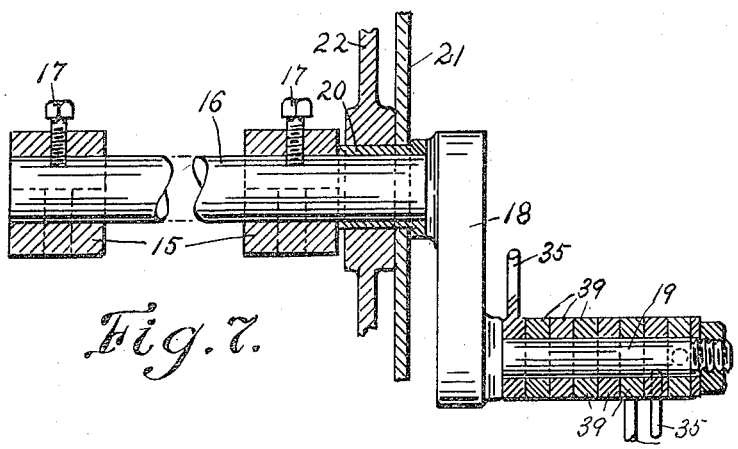

July 1, 1924.

F. W. ERICKSON

PIPE CUTTING OR SAWING MACHINE

Filed June 28, 1921      4 Sheets-Sheet 4

1,499,812

Witnesses
L. H. Erickson
L. H. Franz

Frederic W. Erickson INVENTOR.

Patented July 1, 1924.

1,499,812

UNITED STATES PATENT OFFICE.

FREDERIC W. ERICKSON, OF PELHAM MANOR, NEW YORK.

PIPE CUTTING OR SAWING MACHINE.

Application filed June 28, 1921. Serial No. 480,982.

*To all whom it may concern:*

Be it known that I, FREDERIC W. ERICKSON, a citizen of the United States, and resident of Pelham Manor, in the county of Westchester and State of New York, have invented certain new and useful Improvements in Pipe Cutting or Sawing Machines, of which the following is a specification.

This invention relates to metal cutting machinery and has particular reference to machines or appliances for sawing pipes or conduits, especially such as are used in the installation of electric wiring. I do not, however, limit myself to the use of my improved machine or appliance for any specific purpose.

Heretofore iron pipes have been cut either by a hack saw, a wheel hand cutter, or by rotating the pipe in a lathe and using a cutting-off tool. The latter is a cumbersome and slow method. A wheel cutter leaves the pipe deformed, the exterior diameter being enlarged and the interior diameter decreased, so that it is not suited for use where the pipes are to be joined without restriction at the joints. And pipes so cut are not suitable for use in installing a conduit for electric wiring because for such purpose the joined pipes must have a smooth and continuous raceway for the proper drawing in of wires. Therefore the most commonly practiced method is to employ a hand-operated hack saw. The well-known power-operated hack saws leave a burr on the inside of the pipe for a portion thereof and a burr on the outside opposite the inside burr. While satisfactory work can be produced by a hand-operated hack saw, rotating the pipe while doing so, it is a slow method and an expensive one on account of the high cost of labor.

The object of my invention is to provide a machine or appliance by means of which practically all manual labor is eliminated, and which will do the work properly in a small fraction of the time necessary to do the work by hand. I attain this object by a machine in which a power-operated series of independently mounted saw blades continuously move in a path following one another. This, so far as I am aware, is broadly new with me.

With the above and certain other objects the advantages of which will be explained hereinafter, my invention consists in the construction and combinations of parts substantially as hereinafter described and claimed.

Of the accompanying drawings which illustrate my invention in one of its embodiments:—

Figure 5 is an enlarged view of one of the saw holders.

Figure 6 is an enlarged sectional elevation of one of the studs carried by the wheel or disk, the line of section including one of the saw blades.

Figure 7 is a sectional side view of the fixed shaft on which the saw-blade carrier rotates, and the off-set arm of said shaft.

Similar reference characters indicate similar parts in all of the views.

Figure 1:
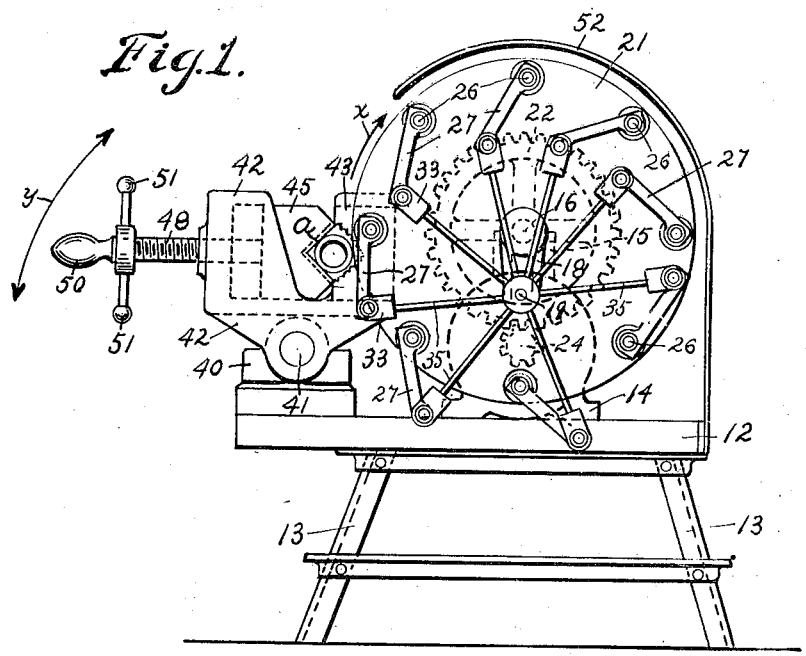
Figure 1 is a side elevation of the complete machine.
Figure 2:
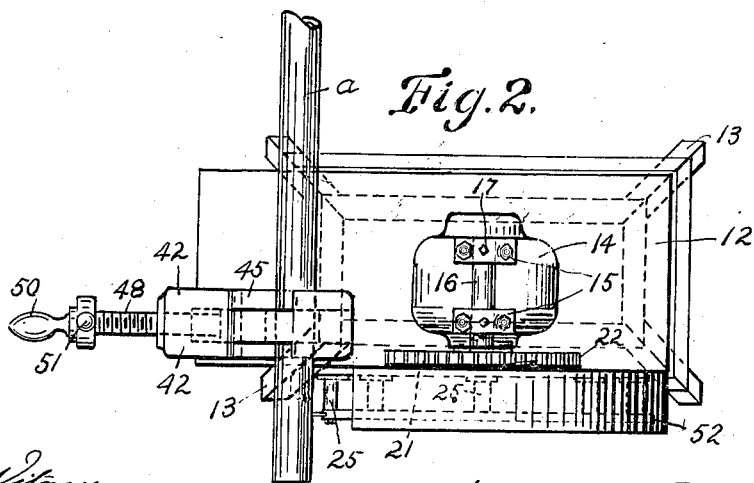
Figure 2 is a plan view of the same.

Referring first to Figures 1 and 2, a suitable support for the machine may comprise a bench 12 mounted on legs 13. Mounted on the bench 12 is a suitable motor which may be and preferably is electric. It may be any other kind of motor or the power for operating the machine might, without departing from the principal features of my invention, be furnished by hand. In the drawings the part indicated at 14, and which may be the casing of an electric motor, supports two brackets 15 (Figs. 2 and 7) in which a shaft 16 is mounted and rigidly secured therein by suitable means such as set screws 17. Said fixed shaft has, at one end, a downwardly extending rigid arm 18 having a horizontal pin 19 projecting laterally from its lower end (Figs. 1, 3, 4 and 7).

Figure 3:
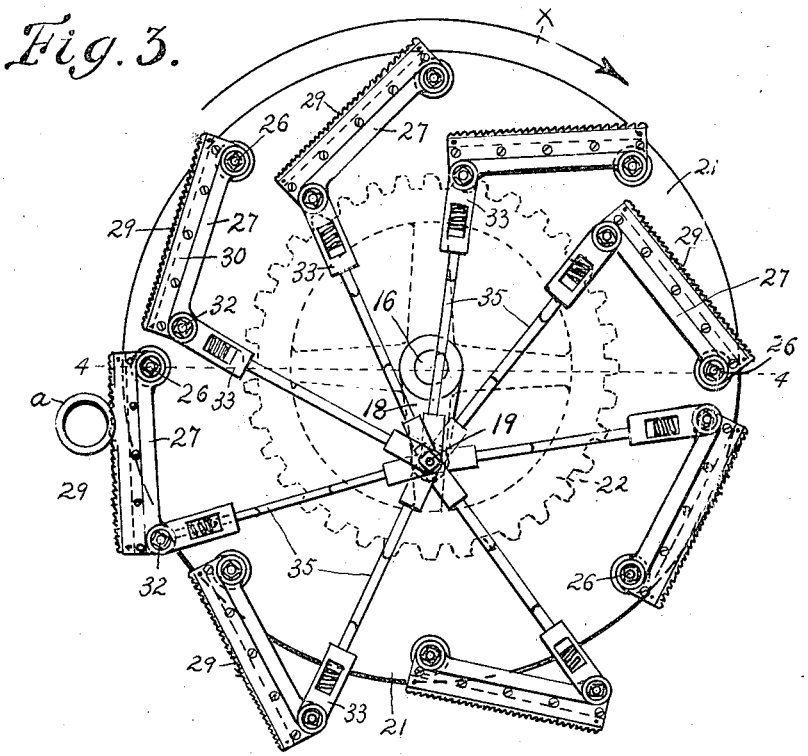
Figure 3 is a detail side elevation of the saw blade carrier.
Figure 4:
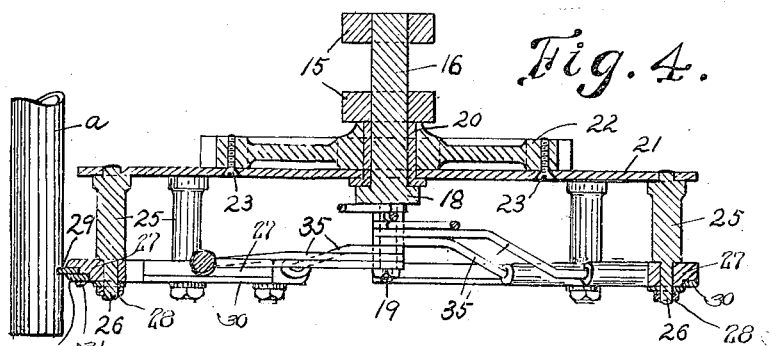
Figure 4 represents a section on line 4—4 of Figure 3, omitting some details.

Surrounding the shaft 16, adjacent to the arm 18, is a sleeve or bushing 20 forming a bearing for the rotary carrier or wheel shown as a disk 21. A spur gear 22 is secured to one side of the disk, as by screws 23 (Fig. 4). Meshing with the spur gear is a pinion 24 of a motor in the casing 14, so as to rotate the gear and its attached disk in the direction of the arrows *x* in Figures 1 and 3.

Secured to and projecting from the side of the disk opposite that side to which the gear 22 is secured, are studs 25 (Figs. 4 and 6). As indicated in Figures 1 and 3 there are eight of said studs, which is a preferable number although there may be a greater or lesser number. The outer end of each stud is reduced in diameter to provide a pin 26 on which is pivotally mounted the bar member 27 of a saw blade holder, said bar being retained on the pin by a nut 28 fitting the threaded end of the pin. Each bar 27 (see Figs. 5 and 6) is cut away or otherwise formed to form a lip or flange and a shoulder, to support one side and the base or bottom edge of a thin flexible saw blade 29, a binding plate 30, secured by screws 31, holding the saw blade rigidly in clamped position. As indicated in Figure 5, pins are preferably driven through holes in the plate 30, the ends of the saw blades, and the lip of the bar 27. As illustrated, the construction is such that the saw blades may be ordinary and easily obtained commercial hack saw blades, which blades are always thin and flexible and are comparatively inexpensive.

Pivotally connected to the other end of each saw blade holder, at 32, is a shackle 33 having an opening or recess 34 through and beyond which a connecting rod or link 35 extends, said rod being slidingly fitted in the shackle and having a block 36 secured to it, as by a pin 37. The block 36 fits the opening 34 and a spring 38 is confined between it and the other end of said opening. The object of said spring will be explained hereinafter.

The other end of each rod or link 35 is formed or provided with an eye 39, and all of the eight eyes are mounted on the fixed pin 19 which is eccentric to the axis of rotation of the carrier 21.

The piece of work to be cut, such as the pipe *a*, is held by a vise the construction of which will be presently explained, in about the position shown in Figures 1, 2, 3 and 4. Then, as the saw carrier 21 rotates in the direction of the arrow *x* the series of saw blades follow each other and act on the pipe without liability of any relative lateral movement. Owing to the fact that each blade holder is pivoted at one end to the carrier and at the other end to a link which, at its inner end, is pivoted at a fixed point eccentric to the axis of rotation of the carrier, (said fixed point being the pin 19), the toothed edge of each saw travels in a substantially straight path or line while passing the pipe. It is not essential that the travel shall be in an exact straight line. The construction illustrated provides for an easy entrance of the first few teeth of each saw blade, then practically a uniform cutting action for each succeeding tooth until near the end of the series of teeth, the last few teeth of the blade receding slightly from the pipe. The springs 38 of course aid in ensuring practically uniform operation of the blade as it passes the work, but an important feature of the said springs is that they provide for a safety release in case a saw blade meets a hard spot in the work or if the work is fed toward the carrier too rapidly by the feeding movement of the vise hereinafter described.

Owing to the fact that a multiplicity of hack saw blades are employed, said blades being arranged to act successively and each one acting during only a small fraction of the rotation of the entire series, each tooth of each blade is able to do its cutting work at maximum speed and during minimum time without heating to a degree that will be detrimental to its operative life. During the greater part of the time of rotation of the carrier the teeth are travelling in free air so as to entirely dissipate the heat caused by the work done in passing the pipe held in the vise.

Since there is no possibility of a saw blade contacting with the work except when moving in the cutting direction, each blade is used to its best advantage. As is well known, many workmen when doing hand sawing, sometimes drag the saw teeth against the work on return strokes. This causes heating of the blade and is liable to otherwise damage the teeth.

As clearly illustrated by Figures 5 and 6, each thin blade is held by a continuous clamp along its entire length. It is therefore so braced laterally that it will do its work with no lateral flexure. When sawing by hand the blade is held in the frame under strong tension to avoid lateral flexure. This, even when the workman exercises great care, frequently causes the blade to break when striking a hard spot in the work or if the sawing is done a trifle out of line.

Figure 8:
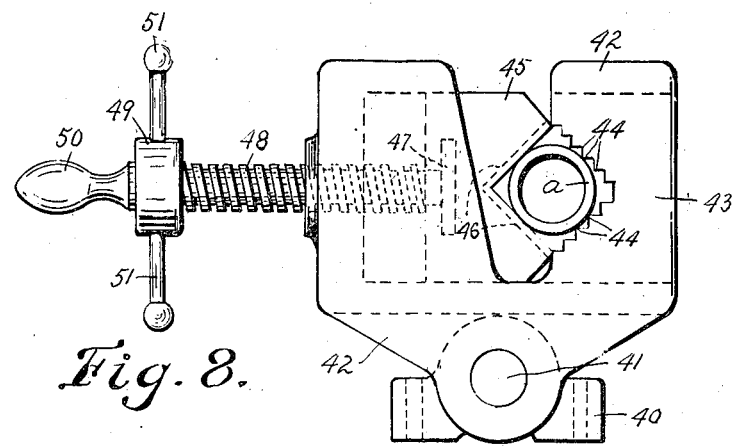
Figure 8 is a side elevation of the pipe-holding vise.
Figure 9:
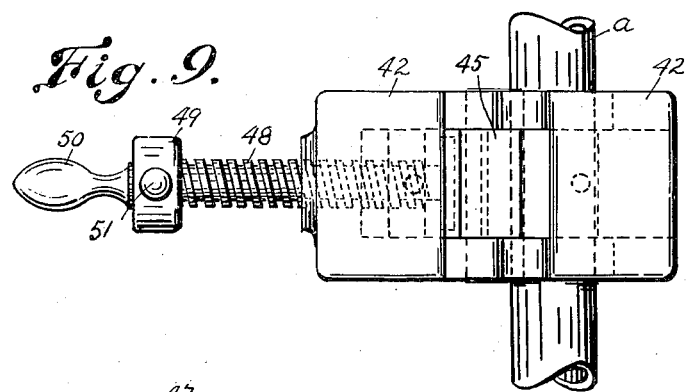
Figure 9 is a plan view of the same.
Figure 10:
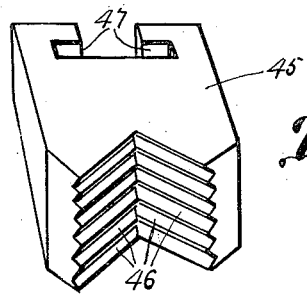
Figure 10 is a perspective view of one of the vise jaws.

Referring now to Figures 8, 9 and 10, in connection with Figures 1 and 2, a block 40 suitably secured to the bench is formed to provide a trunnion or pivotal support 41 for the vise casting 42 which is formed or provided with a rigid jaw 43 having its recessed side formed with horizontal teeth 44. That is, said teeth 44 are formed to engage the pipe in lines parallel with the length of the pipe. The other jaw 45 of the pair is a sliding one; that is, it is mounted to be adjusted in a recess in the casting 42. Its recessed side is formed with teeth 46 at a right angle to the teeth of the fixed jaw so that, while the teeth 44 tend to prevent rotation of the pipe, the teeth 46 prevent longitudinal movement of the pipe but will aid in guiding it during any rotation.

The back of the jaw block 45 is formed with a recess T-shaped in cross section to engage the inner head 47 of a screw 48 having a hub 49 at its outer end, said hub having an outwardly extending handle 50 by means of which the entire vise may be rocked on its pivot 41, and having laterally extending arms 51 by means of which the jaw 45 may be adjusted relatively to the jaw 43.

A suitable guard to protect the operator in case of accident is indicated at 52 (Figs. 1 and 2), said guard being secured to the bench at one end and extending around the revolving carrier nearly to the vise.

The operation of the machine or tool is intended to be such as to effect a cutting off action of the saws far enough to penetrate the walls of the pipe. Therefore it is necessary to rotate the pipe $a$ so as to complete the cut around the entire circumference of the pipe. The structure and mounting of the pipe-holding vise permits this to be effected automatically by the action of the saws themselves as I will now explain:—Referring particularly to Figures 1 and 8, assume that the operator (the saw carrier rotating in the direction of the arrows $x$ in Figures 1 and 3) grasps the handle 50 which controls rocking or swinging movements of the vise. With the other hand grasping either of the arms 51 he rotates the screw 48 to cause the pipe to be gripped between the vise jaws, and tilt the entire vise by the handle 50 to bring the pipe into contact with the saw blades, gripping the pipe with such pressure relatively to the pressure against the saws as to cause the saws to rotate the pipe in the jaws. In explanation of this, it is to be noted that the action of the saws naturally tends to rotate the pipe. By properly proportioning the force with which the pipe is clamped and the force with which it is pressed against the passing saws, the pipe can be permitted to rotatively slip in the vise but at a very much slower speed of rotation than it would have if entirely free to be revolved by the saws. The operator, after a little practice, can effect the cutting of the pipe with the greatest facility, allowing just enough rotative movement of the pipe to properly conform to the cutting speed of the hack saws. It is to be understood that, if necessary, the pipe may be assisted in its rotation by hand, with or without employing a wrench applied to the pipe.

In connection with the features of automatic rotation of the pipe as just explained, it is to be noted that owing to the teeth 46 of the jaw 45 being at a right angle to the teeth of the jaw 43 the pipe is guided by said teeth 46 during rotation of the pipe and is prevented from shifting endwise. At the same time the said teeth 46 are able to effect sufficient coaction with the teeth of jaw 43 to grasp the pipe without themselves offering any material opposition to rotation of the pipe.

The device as a whole is sufficiently self-contained to be carried about in buildings, shops, and other places where the work of cutting pipe is to be done.

Reference has been hereinbefore made to the toothed edge of each saw blade travelling in a substantially straight path while passing the pipe. It is to be understood that this means that substantially all of the teeth of each blade operate on work at a fixed point relatively to the axis of rotation of the blade or series of blades, the pipe being gradually moved toward said axis as the cutting proceeds.

Having now described my invention, I claim:

1. A metal cutting machine having a series of saw blades continuously movable in a rotary path following one another, and means for causing each blade to shift its position to present its teeth to the work at a fixed distance from the axis of rotation of the series.

2. A metal cutting machine having a rotary carrier, and a series of outwardly facing saw blades yieldingly mounted on the carrier to follow one another in a single path.

3. A metal cutting machine having a rotary carrier, and a series of saw blades pivotally and yieldingly mounted on the carrier to follow one another in a single path.

4. A metal cutting machine having a rotary carrier, a saw blade holder movably mounted on the carrier, and means to move the holder relatively to the carrier during a portion of the rotation thereof to cause substantially all of the teeth of the blade to operate on work at a fixed distance from the axis of rotation of the carrier.

5. A metal cutting machine having a rotary carrier, a series of saw blade holders movably mounted on the carrier, a work holder movable toward and from the carrier, and means to move each blade holder relatively to the carrier as it passes work in said work holder.

6. A metal cutting machine comprising a series of thin straight-edged saw blades mounted to revolve about a common axis, a work holder movable toward and from said series, and means for manually operating said movable holder.

7. A metal cutting machine comprising a series of thin straight-edged saw blades mounted to revolve about a common axis, a work-gripping holder movable toward and from said series and having means for enabling the operator to vary gripping pressure on the work during operation, and means for manually moving said gripping holder.

8. A metal cutting machine comprising a series of saw blades mounted to revolve about a common axis, a pivotally supported vice adjacent to the path of movement of the saw blades, and means for manually controlling the work-gripping action of the vise and its distance from the axis of rotation of the saw blades.

9. A metal cutting machine comprising a series of saw blades mounted to revolve about a common axis, a work support having toothed jaw faces the teeth of one jaw being parallel with the axis of rotation of the saw blades and the teeth of the other jaw being at a right angle thereto, and means for varying the distance between the work holder and the axis of rotation of the saw blades.

10. A metal cutting machine having a rotary carrier, a straight saw blade holder mounted on said carrier, a thin flexible saw blade mounted in the holder, and means for laterally clamping the saw blade in the holder throughout the length of the blade.

11. A metal cutting machine having a series of holders mounted to revolve about a common axis, each holder carrying a thin flexible saw blade and having means for clamping said blade throughout its length.

12. A metal cutting machine comprising a rotary carrier, a series of saw blade holders pivoted at one end to the carrier and having links connected to their other ends, a single bearing for the other ends of all of the links said bearing being eccentric to the axis of rotation of the carrier, and a work holder adjacent to the path of movement of the blade holders.

In testimony whereof I have affixed my signature.

FREDERIC W. ERICKSON.